UNITED STATES PATENT OFFICE.

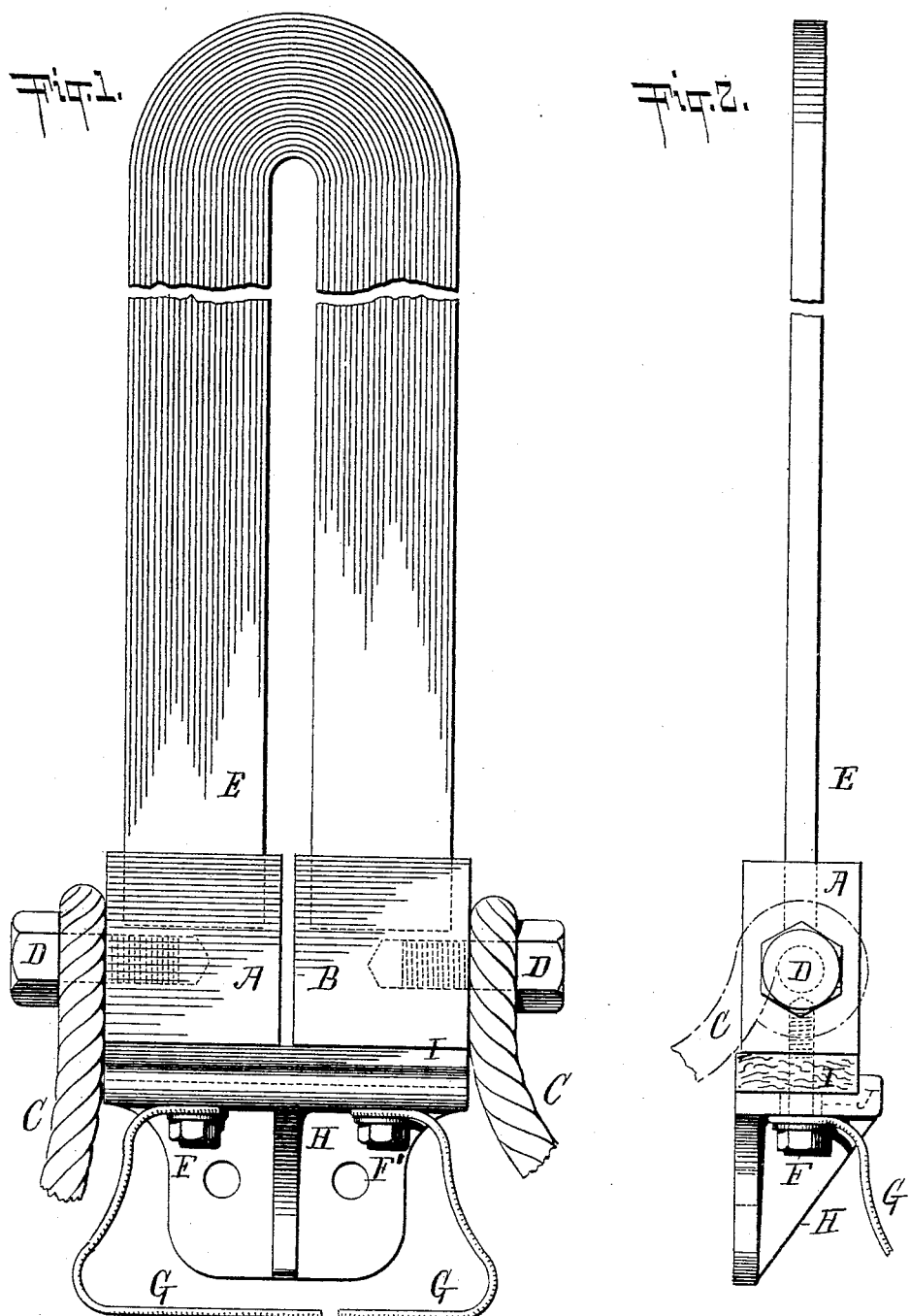

EDWARD WESTON, OF NEWARK, NEW JERSEY.

SHUNT FOR ELECTRICAL MEASURING-INSTRUMENTS.

SPECIFICATION forming part of Letters Patent No. 496,501, dated May 2, 1893.

Application filed November 28, 1892. Serial No. 453,362. (No model.)

*To all whom it may concern:*

Be it known that I, EDWARD WESTON, of Newark, Essex county, New Jersey, have invented a new and useful Improvement in Shunts for Electric Light and Power Stations, of which the following is a specification.

My invention consists of a permanent shunt adapted to be placed in the main circuit of a light or power plant, and to be connected with an electrical measuring instrument so that only a portion of the current of known difference of potential may be conducted to said instrument for purposes of measurement or indication.

My invention consists in the construction of the shunt substantially as herein shown and described.

In the accompanying drawings, Figure 1 is a plan view and Fig. 2 is a side elevation of my improved shunt.

Similar letters of reference indicate like parts.

It is now generally the custom in electric-lighting stations to place the measuring instrument, such as the ammeter, above the switch-board at which the current on the lines is controlled. As the main conductor usually comes in at the lower part of the switch-board, it follows that, in order to make connection with the measuring instrument, it is necessary to carry the conductor upward and back, and thus, especially in the case of large mains, an additional length of cable is required for this purpose. In connecting the instrument to the mains, even in shunt, it is difficult to make such connections so that there will be a certain and definite fall of potential between the terminals; and therefore, it becomes difficult to regulate the percentage of current which the instrument is receiving. My present device can be connected directly in main circuit and there left, permanently; and the small connecting wires for the electrical measuring instrument can be led from it to any desired point.

A and B are terminals of metal, preferably cast copper, to which the ends of the main cable, C, are connected by bolts, D. Secured at its ends to the terminals A and B is a curved plate or rod, E. Also secured to said terminals by means of the bolts F F' are the shunt wires G which may connect with a suitable electrical measuring instrument. The terminals A and B are supported upon a plate, I, of insulating material, such as hard rubber or fiber, and this plate I in turn rests upon the upper surface of the flanged bracket H. The binding screws F F' are provided with bushings, J, of insulating material, which are arranged in the bracket H, and which serve to insulate said screws from said bracket. The said binding screws, F F', extend into the terminals A and B, and in this way make electrical connection with said terminals and also serve to secure the said terminals A and B in fixed or permanent relation one to the other while also uniting the bracket H, the said terminals and the insulating plate I. The current entering at binding post D divides, and part passes from the terminal A to the terminal B through the bent or curved plate E, and part through the shunt wire G. As the terminals A and B are thus fixed in position, and as the plate E is permanently secured thereto, it is evident that the fall of potential between the terminals, depending on the length of said plate, is constant. The cross-sectional dimensions of the plate E may be varied to suit any special conditions of strength of current, and two or more plates, as E, may, if desired, be disposed parallel one to the other, with their ends connected, in the manner already described, to the terminals A and B.

I claim—

1. As a new article of manufacture, a permanent shunt for electric circuits containing two metal blocks, a support therefor, a metal plate bent or curved and extending from one block to the other, and means for connecting the terminals of a main and a shunt circuit to said blocks, substantially as described.

2. As a new article of manufacture, a permanent shunt for electric circuits containing two metal blocks, a support therefor, and a metal plate curved or bent with both arms in the same plane and permanently secured to and extending from one block to the other, and means for connecting the terminals of a main and a shunt circuit to said blocks, substantially as described.

3. As a new article of manufacture, a permanent shunt for electric circuits containing the fixed terminals A and B, the supporting bracket H, bolts, F F', securing said terminals A B to said bracket H and the bent or curved plate E extending from one terminal to the other, and means for electrically connecting to said terminals A and B the ends of main and shunt conductors, substantially as described.

EDWARD WESTON.

Witnesses:
JOHN C. YOUNG,
RICHARD O. HEINRICH.